United States Patent
Muller

[11] 3,762,848
[45] Oct. 2, 1973

[54] EQUIPMENT FOR MOLDING DENTURES
[75] Inventor: Robert E. Muller, Winnetka, Ill.
[73] Assignee: Astron Dental Corporation, Glenview, Ill.
[22] Filed: July 6, 1971
[21] Appl. No.: 159,772

Related U.S. Application Data
[63] Continuation-in-part of Ser. No. 802,045, Feb. 25, 1969, abandoned.

[52] U.S. Cl.............. 425/175, 425/129, 425/180, 425/242
[51] Int. Cl............................................. B29c 1/16
[58] Field of Search.................. 425/242, 180, 119, 425/129, 175

[56] References Cited
UNITED STATES PATENTS

| | | | |
|---|---|---|---|
| 1,353,942 | 9/1920 | Akin | 425/247 X |
| 1,588,023 | 6/1926 | Gutteridge | 425/449 X |
| 2,119,920 | 6/1938 | Konigsmann | 425/180 |
| 2,279,952 | 4/1942 | Pryor | 425/412 X |
| 2,341,991 | 2/1944 | Jackson | 425/180 X |
| 2,442,847 | 6/1948 | Galley | 425/251 |
| 2,571,546 | 10/1951 | Desnoyers | 425/251 |
| 3,131,434 | 5/1964 | Harris | 425/180 X |
| 3,621,519 | 11/1971 | Vandemore et al. | 425/242 X |

*Primary Examiner*—Richard B. Lazarus
*Attorney*—Irwin C. Alter et al.

[57] ABSTRACT

The invention provides processes and equipment for fabricating dentures. The unique injection molding equipment has mold clamping forces that are higher than the injection forces to guarantee mold closure during injection of dental plastic resin. In addition, the said forces are derived from the same pressure source. By these provisions, dentures are provided wherein accurate denture duplication and/or proper fit is reliably obtained and raised bites eliminated.

4 Claims, 1 Drawing Figure

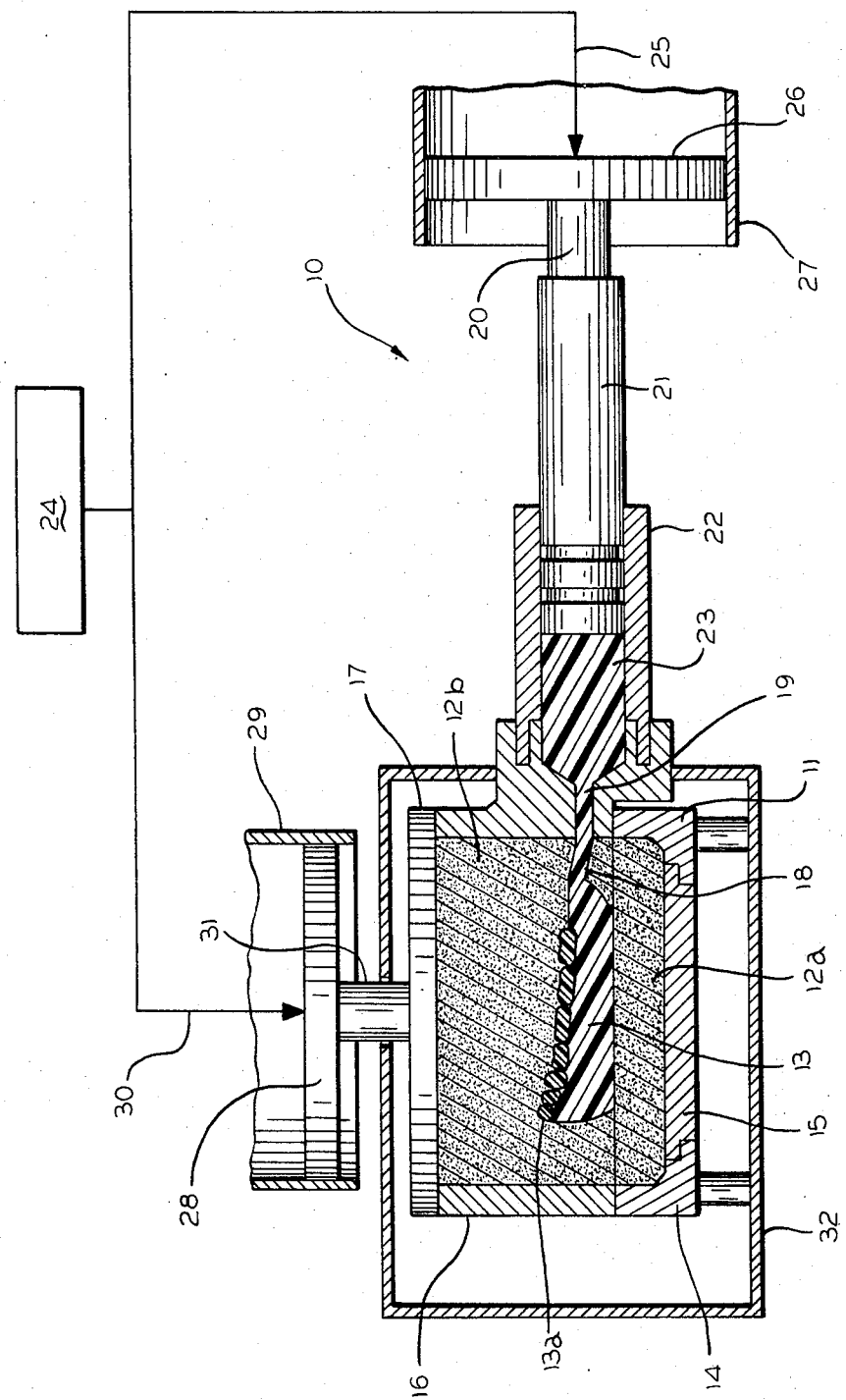

EQUIPMENT FOR MOLDING DENTURES

This is a continuation-in-part of my previously filed patent application entitled "Method And Equipment For Molding Dentures", Ser. No. 802,045, filed Feb. 25, 1969 and now abandoned.

This invention relates to methods and equipment for fabricating plastic dentures, commonly known as "false teeth", and more particularly, to methods and equipment used in molding the dentures.

Presently available denture molding equipment including both compression and injection types have proved to be inadequate. The inadequacy stems from, among other things, curing shrinkage which occurs during the molding process, and thermal shrinkage that occurs during the cooling of the plastic denture in the mold.

Another serious inadequacy of presently used compression molding equipment is caused by over charging or packing of the mold to insure adequate plastic resin and no means of compensating for the curing shrinkage of the denture plastic.

Another serious inadequacy of presently used injection molding equipment is caused by improper spruing of the plastic into the mold. Thus, the presently available denture injection molding apparatus includes sprues that do not enter the mold cavity at the proper point in the denture and/or at the proper plane. Thus, the present sprue position causes strains in the denture and/or tends to lift the dentures away from the mold.

Yet another serious difficulty occurs in the prior art because the molding equipment presently used causes a "raised bite" problem in the finished plastic denture due to the improper mechanical closure of the mold halves which results in a change in the relative position of the teeth in the plaster mold, and the model of the patient's mouth. Thus, this changes the articulation of the teeth in the patient's mouth, which results in a change in the patient's jaw position that can result in discomfort or, even worse, in weakening of the patient's chewing and hearing ability.

Accordingly, an object of this invention is to provide equipment and methods for molding plastic dentures which will preclude any change in the relative position of the teeth and the model of the patient's palate and thus eliminate this critical raised bite problem.

A related object of this invention is to provide molding equipment and methods for minimizing the effects of curing shrinkage, thermal shrinkage and/or strain.

Thus, the inventive mold and method results in a better duplication of the dentist's impression of the patient's mouth and thus provides a better fit of the artificial plastic denture in the patient's mouth and thereby provides a more functional denture for the patient.

A preferred embodiment of the present invention comprises injection molding apparatus. The apparatus includes a single pressure source used to derive a holding force and an injection force. A denture molding flask has its halves held securely in place by the holding force which is always greater than the injection force. The injection force is applied through the injected plastic resin and acts to separate the mold halves. The larger holding force prevents the separation. The flask itself is held within a constant temperature chamber during the entire molding process.

A preferred process for molding the plastic dentures includes the steps of pressure injecting denture plastic resin into a plaster or stone mold held in a dental flask. The injection of the plastic resin fills the cavity and the injection process continues during the curing period. Mold retaining pressure or force is simultaneously applied to the halves of the denture flask mold that is sufficient to assure that the relative position of the teeth in the mold and the surfaces of the cavity of the mold remain absolute. The plastic resin is injected under pressure into the denture cavity horizontal to a plane of the denture and the mold temperature is maintained constant during the molding process. The mold retaining pressure and the injection pressure are derived from the same source.

The above mentioned and other features and objects of this invention and the manner of obtaining them will become more apparent and the invention itself will be best understood by reference to the following description of an embodiment of the invention taken in conjunction with the accompanying drawing which shows in a cross-sectional and schematic view the inventive injection molding apparatus.

Generally designated by numeral 10 is the inventive injection molding apparatus. The injection molding apparatus comprises a denture flask generally designated as 11, for holding a plaster or stone mold 12 therein. The mold 12 is a two piece mold having a bottom portion 12a and a top portion 12b, such as may be manufactured by the well known "lost wax" process. The two mold portions cooperate to form cavity 13 therein. The cavity 13, of course, is in the shape desired for the denture being fabricated through the use of the molding apparatus.

The mold is formed in the usual manner utilized by the dental technician. That is, a negative impression, using plaster or impression compound is made of the patient's mouth, by the dentist, in the area in which the denture is to be placed. The dentist and/or laboratory technician then makes a positive model of the patient's mouth area by using the impression and pouring plaster or stone therein. The positive plaster model is then covered with wax in the form of the desired denture. The dentist and/or laboratory technician then carefully places the porcelain or plastic teeth, shown as 13a, in this wax model, and then into an articulator to guarantee the proper position and function of the teeth during chewing. The final mold is then prepared by casting dental stone or plaster around this wax positive model and teeth so that the dental flask may be opened in two halves. When the mold is hardened, the entire mold is heated, the wax melts, the mold halves opened and the wax removed and the mold cavities cleaned. The teeth 13a remain held in position in the mold. It is this plaster or dental stone mold 12 which is retained within the dental flask 11.

The dental flask 11 is shown as comprising four parts; a base section 14, a base knock-out ring 15, a center section 16, and a cover section 17. The plaster mold fits within the flask so that mold half 12a cooperates with the cover and center sections to form one half of a complete mold unit, and the base 14 and base ring section 15 form the other half of the complete mold unit.

Means are provided for supplying the denture plastic resin in its plasticized form to the mold cavity 13. More particularly, a sprue passageway 18 is left in the mold. The passageway is connected through the flask in the sprue check section 19.

Means are provided for injecting denture plastic into the mold cavity. More particularly, an injection piston 21 is shown leading into an injection nozzle 22. This nozzle is shown as containing denture plastic resin 23. The nozzle 22 may be threaded into the sprue cheek section or positively held in place with any well known fasteners.

Means may be provided in cooperation with the injection nozzle for supplying the denture plastic resin. For example, there may be a passageway and a trough, such as a trough filled with denture plastic leading into the injection nozzle. More commonly, however, the piston is removed and the denture plastic resin is placed into the injection nozzle and the piston is then replaced.

Means are provided for actuating the injection piston to force the denture plastic into the mold cavity. More particularly, a pressure supply source 24 acting through line 25 actuates a piston 26 in a cylinder 27. The piston 26 is directly coupled to the injection piston 21 by means of piston stem 20. Thus, pressure from supply 24 forces piston 26 to move to actuate injection piston 21 against the denture plastic resin. This pushes the denture plastic resin under pressure and/or heat into the mold cavity 13.

Means are provided for maintaining the relative position of the teeth 13a in top mold 12b to the bottom of the mold 12a. More particularly, a second piston 28 is actuated by the pressure supply system or source 24 through line 30. Piston 28 operates in the cylinder 29 and is coupled to cover section 17 by means of piston stem 31, so that the pressure applied from the pressure supply 24 is acting against piston 28 and causes the upper half of the flask to push against the bottom half of the mold and apply a pressure to the mold to supply a force which is greater than force of the dental plastic pushing up against the walls of the mold cavity. In accordance with Pascal's principle, which states that a pressure applied to a confined or enclosed fluid is transmitted undiminished through the fluid and strikes the walls of the container at right angles; the force applied at the top of the mold cavity through the dental plastic resin is equal to the pressure times the cross sectional area of the walls of the mold cavity. Similarly, the pressure applied through piston 28 and cover section 17 provides a force that is equivalent to the pressure times the unit area of the halves of the mold. Without this means for applying pressure to the halves of the mold, the mold cavity would tend to distend or open under the pressure of the injection piston applied through the denture plastic resin. With the positive action of piston 28 in locking the flask closed and applying pressure against the mold halves, the upward force through the denture plastic to the top of the mold is neutralized and/or overcome. The tendency to distend the mold and thereby change the relative position of teeth and the mold cavity bottom is obviated.

A further improvement of this invention is the location of the sprue coplanar with a portion of the denture, such as the pallet, the heel, the label or the buckle, thereby preventing straining of the denture and/or lifting the denture away from the plaster mold model of the patient's mouth at the point of spruing, as commonly occurs when the sprue is not coplanar at the entry portion of the sprue to the denture.

Means are provided for maintaining the temperature constant during the molding and curing process. More particularly, the flask is placed inside a constant temperature chamber 32 during the molding and curing process. The temperature is maintained at approximately 190°F. In the former molding processes, the flask was placed in boiling water (212°F) for curing. However, as it has been previously mentioned, the curing at this temperature caused greater strains on the finished denture. It has been found that by curing at a constant temperature of approximately 190°F, fewer strains due to curing and/or cooling occur, rather than the 212°F boiling temperature. In addition, the injection pressure is maintained during curing so that new plastic resin compensates for all or most of the curing shrinkage.

The denture plastic used in the preferred process is a formulation containing approximately 65 percent Methyl with Methacrylate Polymer and 35 percent Methyl Methacrylate Monomer, for example, "Lucitone" made by the Caulk & Co. During the curing operation, the Monomer is converted into a Polymer.

In operation, the mold 12 is prepared in flask 11. The flask is placed into the constant temperature chamber and held in position with the flask halves together by adequate pressure applied. The chamber is brought to the desired temperature. Denture plastic resin 23 is placed into the nozzle 22 and piston 21 is fitted into the nozzle. Pressure is applied to the piston 21 with a resultant force that is less than the force at piston 31 holding the flask halves together. For economy and convenience, the diameter of the piston 28 is made slightly larger than the diameter of the piston 26.

The common pressure source assures that the forces are self-balancing, eliminating complicated interacting pressure regulators. The plastic is thus injected into the cavity 13. The pressure is maintained during the heating operation to obviate the "raised bite" problem and add supplemental plastic to correct for shrinkage.

After curing, the flask is cooled to room temperature (below 100°F) before removing the pressure from the flask and piston. The plaster mold is taken from the flask and carefully removed from the finished denture.

Thus, applicant's equipment and procedures eliminate or minimizes "raised bite". The curing shrinkage is reduced because excess plastic is injected into the mold to compensate for the shrinkage. Thermal shrinkage of the plastic is reduced because of the molding at the lower curing temperature, and warping due to the spruing is obviated.

Although I have shown a specific arrangement of the parts and features constituting my device, I am aware that many changes may be made in the parts and features, without effecting the performance of the device. Accordingly, I reserve the rights to make such changes as I may deem convenient and necessary and to claim all equivalence falling within the spirit of my invention or the scope of the appended claims.

Having thus described my invention, what I claim and desire to secure by Letters Patent in the United States is:

1. Equipment for molding plastic dentures,
   said equipment comprising a denture flask,
   mold means located in said flask,
   first force means associated with said flask and said mold for applying a first force forcing denture plastic into the mold cavity,
   second force means for applying a second force to the exterior of said mold cavity in a direction for retaining the closed dimensions of the mold cavity during the molding operation, said first force means and said second force means each being pressure actuated piston means with the pressure being derived from a common pressure source applying equal pressure to said first and second force means, said first force means comprising injection cylinder means for injecting denture plastic resin into said cavity, sprue means leading from said injection cylinder into said cavity, the plane of said sprue means being coplanar with the longitudinal dimension of said denture cavity and normal to the direction of the force applied by said second force means, and the force applied by said second force means being greater than the distending force applied by the denture plastic resin when actuated by said first force means.

2. The molding equipment of claim 1 wherein said flask includes flask halves, and wherein said second force means comprises pressure actuated clamp piston means for applying pressure to said flask halves to force said flask halves together.

3. The molding equipment of claim 2 wherein said first force means for forcing denture plastic resin under pressure into the mold cavity comprises injection cylinder means, sprue means leading from said injection cylinder into said cavity, injection piston means associated with said cylinder, and means for pressure actuating said injection piston to force the dental plastic resin from said cylinder through said sprue to said cavity.

4. The molding equipment of claim 3 wherein the flask is located in a constant temperature chamber.

* * * * *